(12) United States Patent
Gordecki

(10) Patent No.: US 7,212,844 B2
(45) Date of Patent: May 1, 2007

(54) CELLULAR TELEPHONE WITH IMPROVED MECHANICAL DESIGN

(75) Inventor: Ryszard J. Gordecki, Green Oaks, IL (US)

(73) Assignee: Motorola Inc., Schaumburg, IL (US)

( * ) Notice: Subject to any disclaimer, the term of this patent is extended or adjusted under 35 U.S.C. 154(b) by 11 days.

(21) Appl. No.: 10/693,248

(22) Filed: Oct. 24, 2003

(65) Prior Publication Data
US 2005/0090296 A1 Apr. 28, 2005

(51) Int. Cl.
*H04Q 7/20* (2006.01)
(52) U.S. Cl. ............................... 455/575.1; 455/575.3; 455/90.3
(58) Field of Classification Search ............. 455/575.1, 455/575.3, 575.4, 90.3, 128, 347, 348, 566; 361/681, 682, 683, 679, 680; 248/535, 536, 248/917; 345/169, 101, 905
See application file for complete search history.

(56) References Cited

U.S. PATENT DOCUMENTS

| | | | | |
|---|---|---|---|---|
| 6,295,038 B1* | 9/2001 | Rebeske | ..................... | 345/1.1 |
| 6,297,945 B1* | 10/2001 | Yamamoto | .................. | 361/681 |
| 6,396,924 B1* | 5/2002 | Suso et al. | ............. | 379/433.13 |
| 6,643,124 B1* | 11/2003 | Wilk | .......................... | 361/681 |
| 6,792,293 B1* | 9/2004 | Awan et al. | ................ | 455/566 |
| 6,865,400 B2* | 3/2005 | Oh et al. | ................. | 455/556.2 |
| 2003/0228847 A1* | 12/2003 | Matsumoto | ............... | 455/90.3 |
| 2004/0145865 A1* | 7/2004 | Lin | ............................ | 361/683 |
| 2005/0153668 A1* | 7/2005 | Lee | ........................... | 455/90.3 |

* cited by examiner

Primary Examiner—Jean Gelin
(74) Attorney, Agent, or Firm—Matthew C. Loppnow

(57) ABSTRACT

A portable telephone (100, 700) such as a flip type cellular telephone is provided with a pivoting head (112, 710), that includes a multipurpose auxiliary display (118, 720), and a camera (122, 716). The pivoting head facilitates using the camera to capture pictures of the user of the cellular telephone, or of a scene that the user is observing.

18 Claims, 4 Drawing Sheets

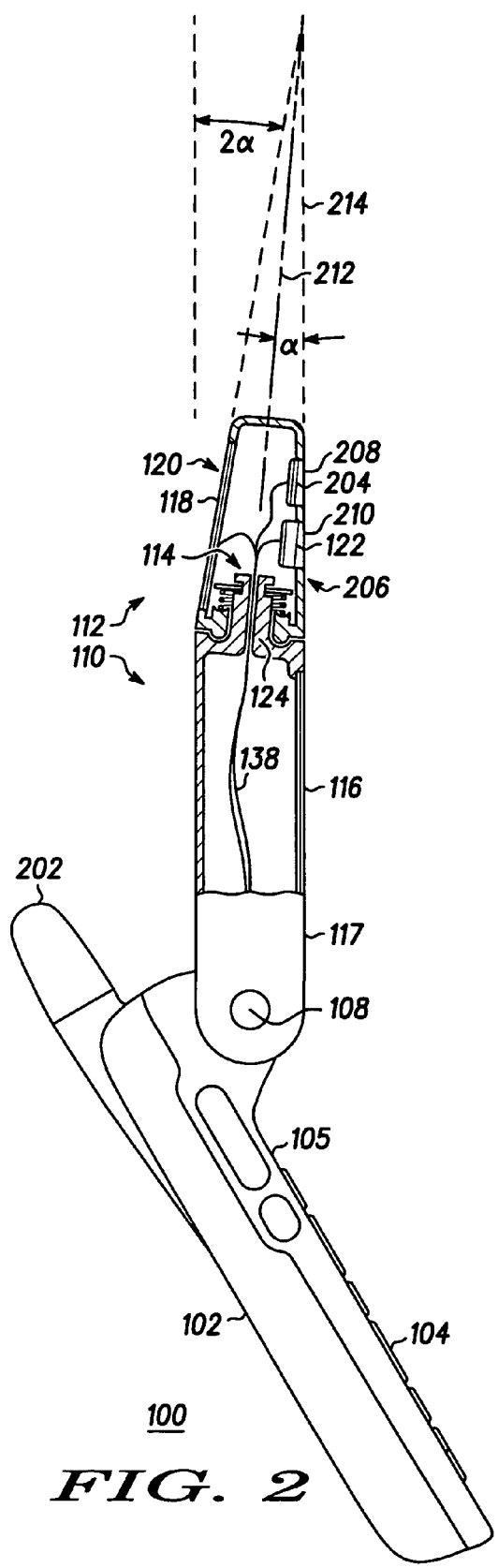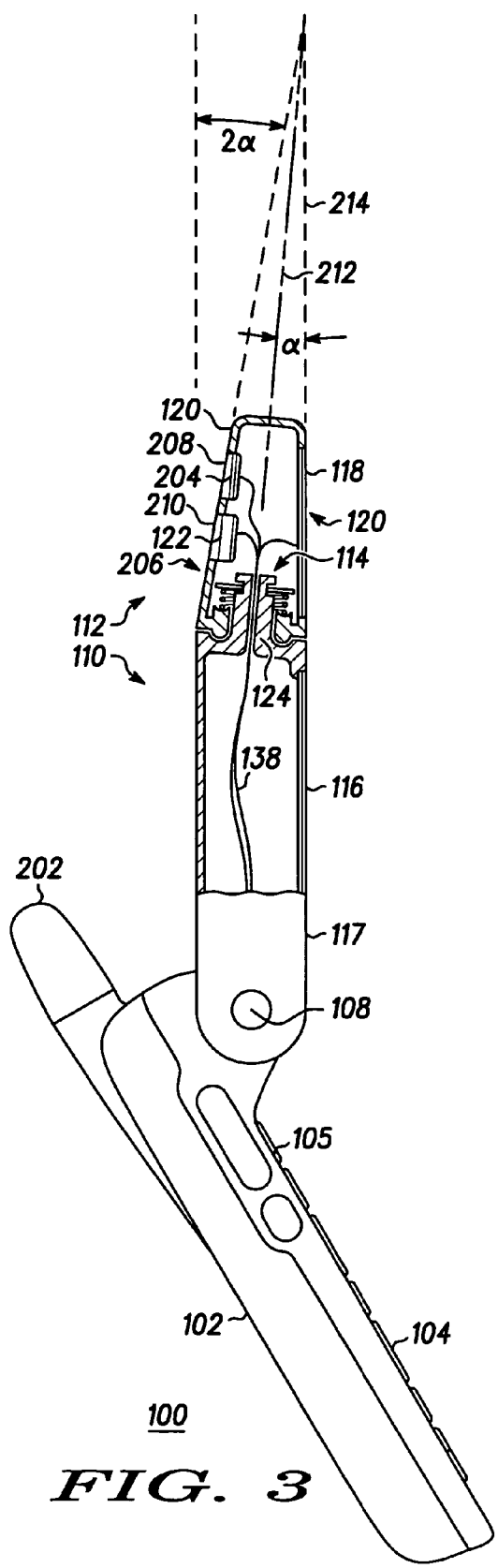

CELLULAR TELEPHONE WITH IMPROVED MECHANICAL DESIGN

BACKGROUND OF THE INVENTION

1. Field of the Invention

The present invention relates in general to cellular telephones. More particularly, the present invention relates to clamshell style cellular telephones.

2. Description of Related Art

In the past decade the use of cellular telephones has increased to the point that a high percentage of people in many societies carry cellular telephones with them at all times and enjoy the ready access to telephonic communications that the cellular telephones provide. Recently, there is an interest in enhancing the functionality of phones, so that users who already carry cellular telephones will be able to make greater use of them. In this vein, and in anticipation of increased cellular network bandwidth, recently cameras have been integrated into cellular phones, in order to allow user to transmit still pictures and video.

Cellular telephones having a statically mounted camera facing the front of the cellular telephone, allow users to take a picture of themselves while operating controls on the front of the telephone. However simultaneously operating controls on the front of the telephone, while taking a picture of a scene in front of the user is ergonomically problematic.

One ergonomically advantageous cellular telephone is the clamshell type. Clamshell type cellular phones are quite small when folded allowing them to be easily stowed, while at the same time when opened up to an obtuse angle are long enough to bridge the distance between the ear and mouth. Recent models of clamshell type cellular telephones have small displays on the outside of the top half that are viewable when the telephone is closed. Such small displays are used to display caller ID information to the user without the user having to open the telephone, thus allowing the user to selectively answer calls without opening the telephone, and allowing the telephone to be configured to automatically answer incoming telephones when the user opens the telephone. However, the use of such displays is limited since they are not visible when the telephone is opened and the user is facing the main display, and keyboard.

BRIEF DESCRIPTION OF THE FIGURES

The present invention will be described by way of exemplary embodiments, but not limitations, illustrated in the accompanying drawings in which like references denote similar elements, and in which:

FIG. 2 is a cut away side view of the clamshell cellular telephone shown in FIG. 1;

FIG. 3 is a cut away side view of the clamshell cellular telephone shown in FIGS. 1–2 with the pivoting head in a second position;

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
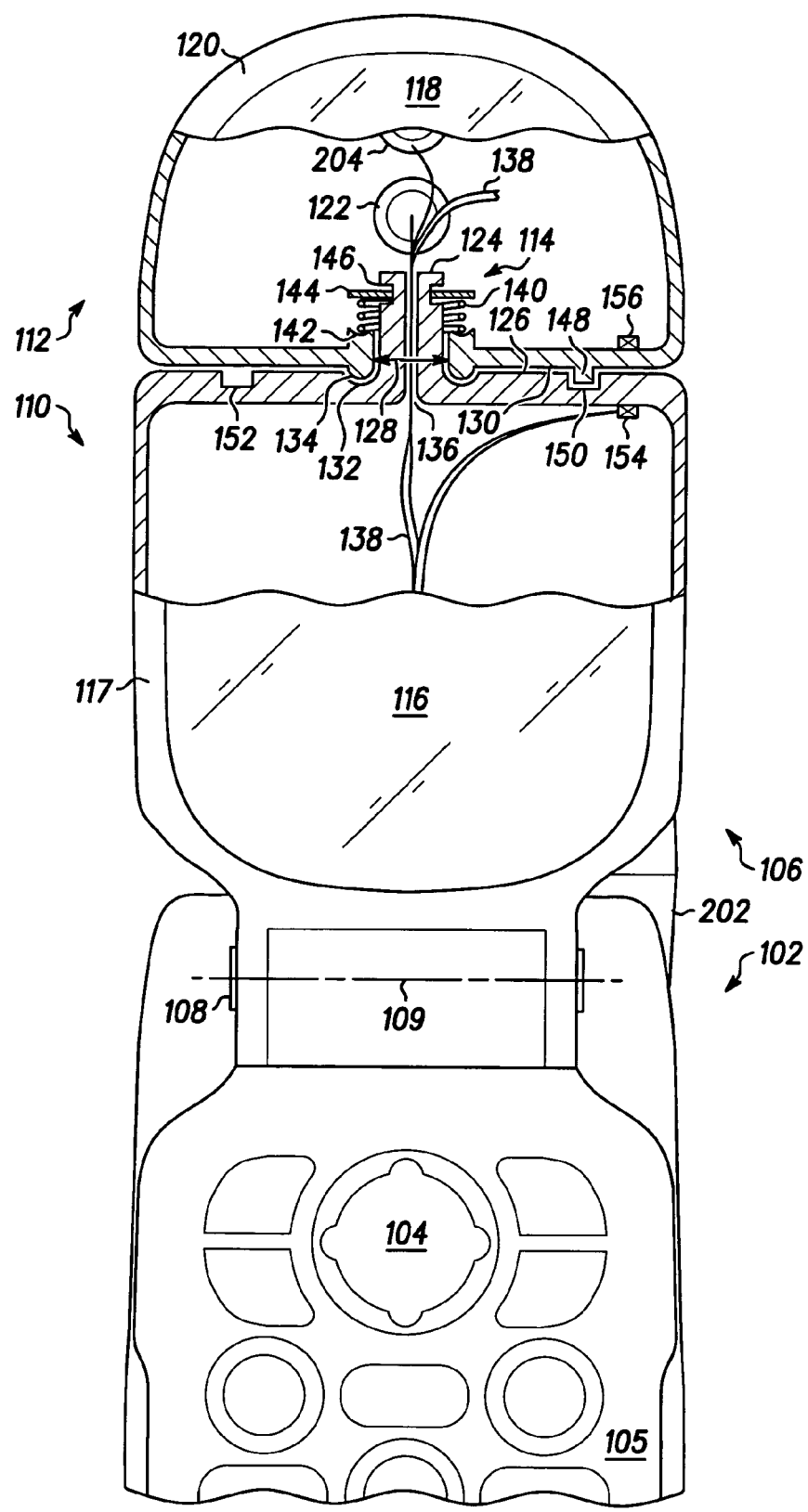
FIG. 1 is a cut away front view of an embodiment of a clamshell cellular telephone including a pivoting head in a first position.

FIG. 1 is a cut away front view of an embodiment of a clamshell cellular telephone 100, and FIG. 2 is a cut away side view of the clamshell cellular telephone 100 shown in FIG. 1. The cellular telephone 100 comprises a lower half 102 that includes a keypad 104, and encloses electrical circuits on one or more circuit boards (not shown). An antenna 202 attaches to the lower half. The cellular telephone 100 further comprises an upper half 106, that is coupled to the lower half 102 by a hinge 108. The hinge 108 includes a hinge axis 109. The upper half is known in the art as the 'flip'.

The upper half 106 comprises a lower part 110 that is coupled to the lower half 102 of the cellular telephone by the hinge 108, and a pivoting head 112 that is coupled to the lower part 110 by a pivot mechanism 114. A main display 116 for the cellular telephone 100 is located at a surface 117 of the lower part 110 of the upper half 106. The pivoting head 112 includes an auxiliary display 118, an earpiece speaker 204, and a camera 122. The auxiliary display 118 is located on a first side 120 of the pivoting head 112, and the earpiece speaker 204, and the camera 122 are located adjacent a second side 206 of the pivoting head 112. The pivoting head 112 includes an acoustic port 208 proximate the earpiece speaker 204 on the second side 206. In use a user positions the cellular telephone 100, so that the acoustic port 208 is adjacent the user's ear. The second side 206 of the pivoting head 112 also includes an aperture 210 through which the camera 122 views a scene in the surroundings of the cellular telephone 100.

Generally, when the user is entering data or commands and/or configuring the cellular telephone 100, the cellular telephone 100 will be positioned so that the keypad 104 and the main display 116 face the user. This position facilitates operating the keypad 104 to control the cellular telephone 100, and viewing the main display 116 in order view information displayed on the main display 116 in response to keystrokes.

In the position shown in FIG. 2, the pivoting head 112 is oriented so that the auxiliary display 118 faces in a direction opposite to the direction the main display 116 faces. When the auxiliary display 118 faces away from the main display 116 and the cellular telephone 100 is closed by bringing the upper half 106 along with the pivoting head 112 to the lower half 102, the main display 116 will be concealed, but the auxiliary display 118 will be exposed and is then suitably operated to display caller ID information, or text message information to the user without the user having to open the cellular telephone 100. Furthermore, in the configuration shown in FIG. 2, with the cellular telephone 100 open, the earpiece speaker 204 is suitably positioned for conducting telephone conversations, and the camera 122 is suitably oriented to take a picture of the user if the user holds the cellular telephone 100 in front of his or her face.

FIG. 3 is a cut away side view of the clamshell cellular telephone 100 shown in FIGS. 1–2 with the pivoting head 112 in a second position. The configuration shown in FIG. 3 is the same as that shown in FIG. 1 and different from that shown in FIG. 2. In the configuration shown in FIG. 3, the pivoting head 112 is oriented so that the auxiliary display 118 faces in the same direction as the main display 116. In this orientation, the camera 122 faces in a direction opposite to the direction that the main display 116 faces. Thus if the user holds the telephone 100 so that the keypad 104, and the main display 116 faces him or her, then the camera 122 will be oriented to view the same scene that is viewed by the user looking beyond the telephone 100. In this configuration the main display 116 is suitably operated to display the scene captured by the camera 122, and the auxiliary display 118 is suitably operated to display a text message as it is composed by the user using the keypad 104. The user can readily compose a text message or notation that is to be associated with a picture taken by the camera 122 while taking the picture. The picture along with the message or notation is then suitably stored in the cellular telephone 100, or transmitted through a cellular network (not shown).

Thus, depending on the orientation of the pivoting head 112, the camera 122 can be oriented to take a picture (or video) of the user while the user operates the keypad 104 (e.g., to control the camera), or to take a picture (or video) of a scene in front of the user while the user operates the keypad 104.

As indicated in FIGS. 2–3 the pivot mechanism 114 includes a pivot axis 212. The pivot axis 212 is normal to, though does not necessarily intersect, the hinge axis 109. The lower part 110 of the upper half 106 of the cellular telephone 100 includes a longitudinal axis 214. The longitudinal axis 214 is parallel to the plane of the main display 116, and perpendicular to the hinge axis 109. In the perspective of FIGS. 2–3, the pivot axis 212 is rotated in the counterclockwise direction by an acute angle of alpha relative to the longitudinal axis 214. Setting the pivot axis 212 at an acute angle relative to the longitudinal axis 214 allows the pivoting head 112 to be oriented to face different azimuthal angles about the longitudinal axis 214. The pivot axis 212 and the longitudinal axis 214 define a plane that is perpendicular to the first 120, and second 206 sides of the pivoting head 112. The angle between the pivot axis 212 and the longitudinal axis 214 is suitably less than 20 degrees, and more suitably less than 15 degrees. This angle can be adjusted to accommodate different styling of the cellular telephone 100. The first side 120 (including the auxiliary display 118), and the second side 206 of the pivoting head 112 are inclined toward each other so that the pivoting head 112 is tapered to a smaller width toward the top of the telephone 100. Specifically, in the perspective of FIG. 2, with the pivoting head 112 oriented as shown, the first side 120 is tilted clockwise by the acute angle alpha relative to the pivot axis 212, and the second side 206 is tilted counterclockwise by the acute angle alpha relative to the pivot axis 212. By virtue of the above described tilt of the pivot axis 212 relative to the longitudinal axis 214 by alpha, and the tilt of the two sides 102, 206 of the pivoting head 112 by the angle alpha in opposite directions, whichever of the sides 120, 206 of the pivoting head 112 is oriented toward the front of the telephone 100 (main display 116 side) will be parallel with the surface 117 of the lower part 110 including the main display 116, and owing to the transverse dimensioning of the pivoting head 112, and central placement of the pivot mechanism 114, will be flush with surface 117 of the lower part 110. Additionally the upper half 106 will present the same profile to the lower half, allowing the cellular telephone to be closed whether the pivoting head 112 is oriented as shown in FIGS. 1,3 or as shown in FIG. 2. The lower half 102 comprises an inside surface 105 which comes to the upper half 106 when the upper half 106 is rotated toward the lower half about the hinge 108.

Arranging the auxiliary display 118, parallel to the main display 116 is desirable from an ergonomic standpoint and also allows the auxiliary display 118 to be operated as an extension of the main display 116. Additionally whichever side 120, 206 of the pivoting head 112 faces away from the main display 116 will be oriented at an angle of two times alpha relative to the longitudinal axis 214 of the upper half 106. By selecting angles of the sides 120, 206 of the pivoting head 112, and tilting the pivot axis 212, as described above a tapered design of the pivoting head 112 is achieved.

Alternatively, the pivot axis 212 is arranged parallel to the longitudinal axis 214, and parallel to the sides 120, 206 of the pivoting head 112.

The pivot mechanism 114 comprises a pinion 124 that is integrally molded with the lower part 110 of the upper half 106. The pinion 124 extends upward from a top surface 126 of the lower part 110, into a hole 128 in a bottom surface 130 of the pivoting head 112. An annular, axially acting cam surface 132 is integrally formed on top surface 126 of the lower part 110 surrounding and concentric with the pinion 124. An annular follower surface 134 is integrally formed on the bottom surface 130 of the pivoting head 112 surrounding and concentric with the hole 128. The annular follower surface 134 has a profile that is complementary to that of the cam surface 132 and axially engages the cam surface 132. A hole 136 that extends axially through the pinion 124 serves as an electrical feed through for one or more narrow strips of flexible printed circuitry 138 used to conduct signals into and out of the pivoting head 112. The narrow strips of flexible printed circuitry 138 are electrically coupled to the auxiliary display 118, to the earpiece speaker 204, and to camera 122. Integrated circuits, such as a display driver for the auxiliary display 118 are optionally included in the pivoting head 112.

Alternatively, the pinion 124 is attached to the pivoting head 112, and the hole 128 is formed in the lower part 110 of the upper half 106.

Figure 4:
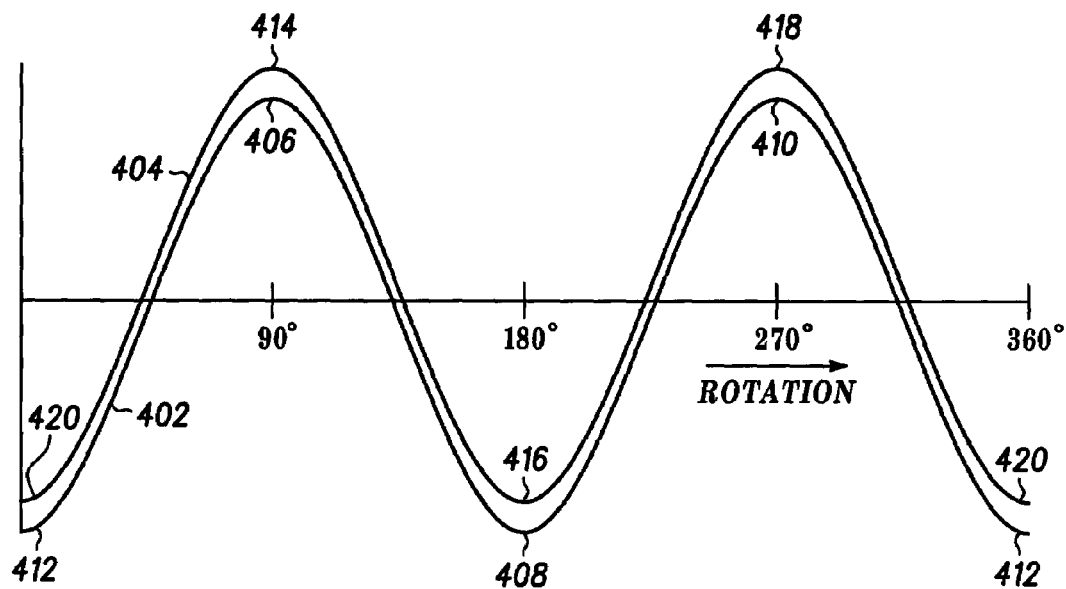
FIG. 4 is a graph including plots of profiles of a cam and complementary follower included in the cellular telephone shown in FIGS. 1–3.
Figure 5:
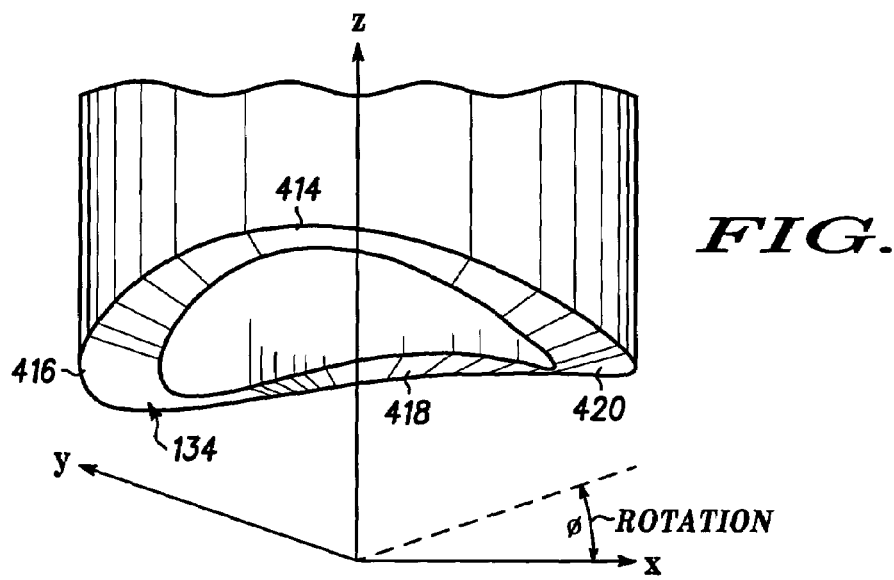
FIG. 5 is a fragmentary perspective view of the follower represented in FIG. 4.

FIG. 4 is a graph including plots of the profiles of the cam surface 132, and follower surface 134 as a function of rotation angle. A first plot 402 shows the profile of the cam surface 124 and a second plot 404 shows the profile of the complementary follower surface 126. The profile 402 of cam surface 132 is smoothly varying in height, and resembles two cycles of a sinusoid. As shown in FIG. 4 the profile of the cam surface 132 includes a first peak 406, a first valley 408, a second peak 410, and a second valley 412. Similarly, the profile of the follower surface 134 includes a first peak 414, a first valley 416, a second peak 418, and a second valley 420. FIG. 5 is a fragmentary perspective view of the follower represented in FIG. 4 and shown in FIGS. 1–3.

Referring again to FIGS. 1–3, the pivot mechanism 114 further comprises a coil spring 140 that is positioned around the pinion 124, and sits on an annular spring seat 142 formed in the pivoting head 112 around the hole 128. A spring retainer in the form of a snap washer 144 that fits in an annular groove 146 in the pinion 124 holds the spring 140 in compression, setting up a spring force that urges the pivoting head 112 toward the lower part 110 of the upper half 106 and causing the follower surface 134 to engage the cam surface 132. Given the profiles of the cam surface 132, and follower surface 134 described above and shown in FIGS. 4–5, there are two relative orientations of the pivoting head 112, and lower part 110 that minimized the compression of the coil spring 140, and are consequently stable. One stable relative orientation is that depicted in FIGS. 1, 3 and another is depicted in FIG. 2. Referring to FIG. 4, in one stable configuration the first peak 406 of the cam surface 132 is aligned with the first peak 414 of the follower surface 134. In the other stable configuration the first peak 406 of the cam surface 132 is aligned with the second peak 418 of the follower surface 134. Thus, the coil spring 140, cam surface 132, and follower surface 134 serve to bias the pivoting head 112 to one of the two orientations.

According to an alternative embodiment the cam surface 132, and follower surface 134 are eliminated so that the pivoting head 112 is not biased to any particular orientation. Although certain particular details of the pivot mechanism 114 are illustrated in FIGS. 1–5, different type pivot mechanisms are alternatively used.

Figure 6:
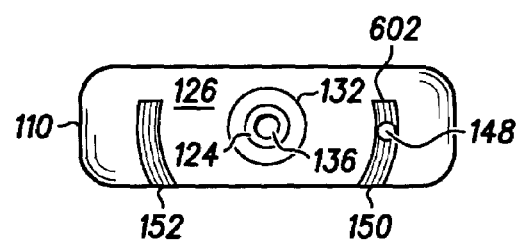
FIG. 6 is a top view of a lower part of an upper half of the cellular phone shown in FIGS. 1–3.

In order to prevent the pivoting head 112 from being turned repeatedly in the same direction, and overstressing the flexible printed circuitry 138 a rotation stop mechanism is provided. FIG. 6 is a top view of a lower part of an upper half of the cellular phone shown in FIGS. 1–3 highlighting parts of the rotation stop mechanism. As shown in FIGS. 1, 6 the rotation stop mechanism comprises a stop peg 148 that depends from the pivoting head 112. As the pivoting head 112 rotates, the stop peg 148 passes through a first arcuate groove 150, and a second arcuate groove 152 formed in the top surface 126 of the lower part 110 of the upper half 106. The first arcuate groove 150 is closed at one end 602 (i.e. does not go all the way through the depth of the lower part 110) so as to stop the rotation of the pivoting head 112. The second arcuate groove 152 is also closed at one end 604, so as to stop the rotation of the pivoting head 112. The length of the arcuate grooves 150, 152 is set to allow the pivoting head 112 to rotate through about 180 degrees. The length of the arcuate grooves 180 can be extended to allow a rotation range that exceeds 180 degrees. In such a case the cam surface 132 and follower surface 134 will, nonetheless bias the rotation of the pivoting head 112 to two orientations that are 180 degrees apart. Although, a particular form of stop mechanism is shown in FIGS. 1,6, alternatively another type of stop mechanism is used.

In order for a processor (not shown) of the cellular telephone 100 to operate in a manner responsive to the orientation of the pivoting head 112, the telephone 100 comprises an orientation detection system. As shown in FIG. 1 the orientation detection system comprises a hall effect switch 154 disposed in the lower part 110 proximate the pivoting head 112, and a magnet 156 disposed in the pivoting head 112 proximate the lower part 110. When the pivoting head 112 is oriented as shown in FIGS. 1, 3 the hall effect switch 154 and the magnet 156 will be in close proximity to each other, allowing the hall effect switch 154 to sense the proximity of the magnet, and by that sense the orientation of the pivoting head 112. For certain applications it is appropriate to control the operation of the auxiliary display 118 based on the orientation of the pivoting head 112. For example if the pivoting head 112 is oriented such that the auxiliary display 118 faces the same direction as the main display 116, the auxiliary display is suitably used to display information based on user input entered through the keypad 104. On the other hand, if the pivoting head 112 is oriented such that auxiliary display 118 faces away from the main display 116, then the auxiliary display 118 is suitably used to display caller ID information. Alternatively, the orientation detection system is not used, and the operation of the auxiliary display 118 is based on the state of execution of one or more programs running on the processor of the cellular telephone 100. For example when the cellular telephone 100 is receiving an incoming telephone call, the auxiliary display 118 is used to display caller ID information, and when the user puts the cellular telephone 100 in picture taking mode, the auxiliary display 118 is used to echo text messages, or annotations being entered by the user, or to display information related to the functioning of the camera 122.

As used in this description the term acute angle means an angle less than ninety degrees including zero degrees.

Figure 7:
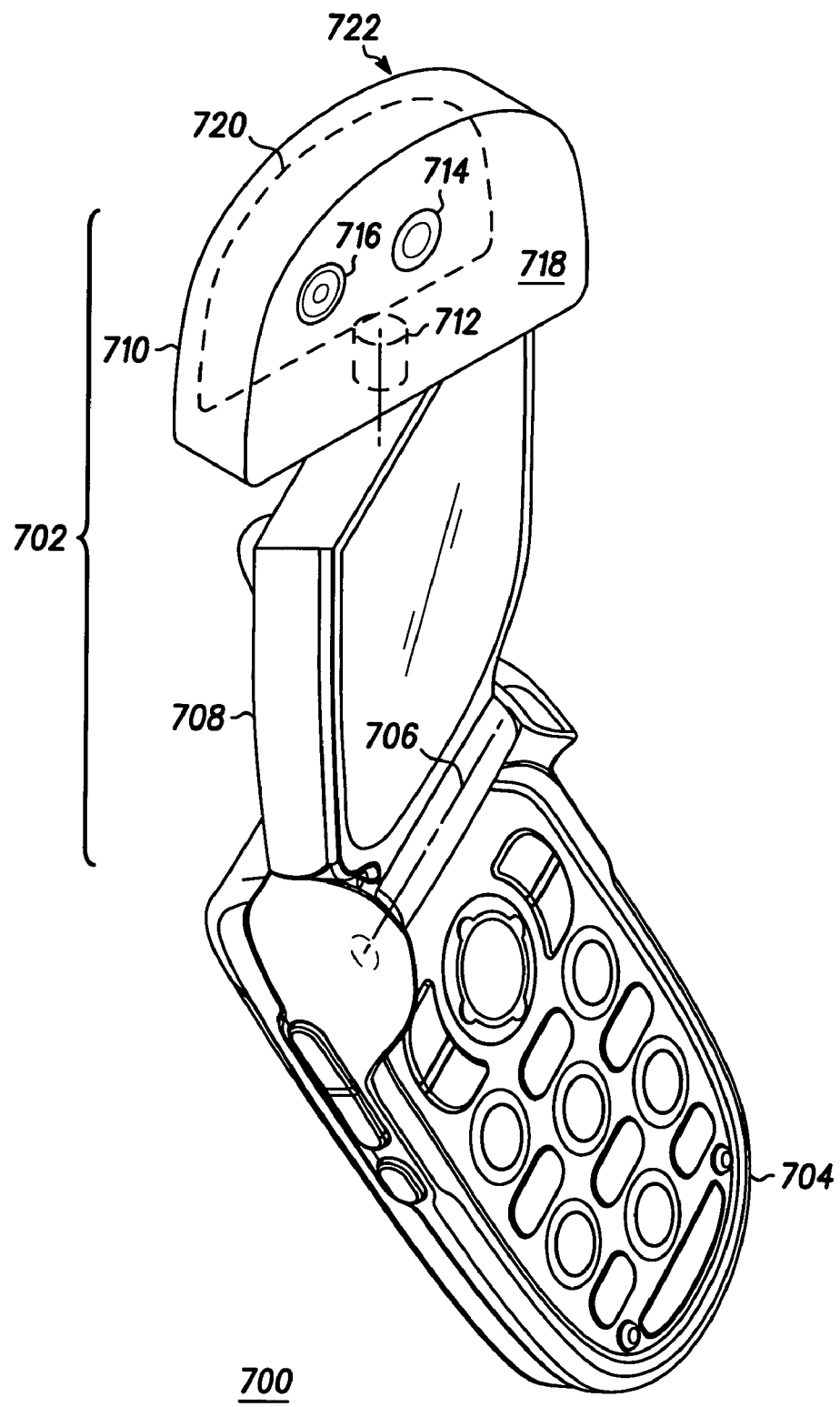
FIG. 7 is a schematic perspective view of a second embodiment cellular telephone.

FIG. 7 is a schematic perspective view of a second embodiment cellular telephone 700. The second cellular telephone 700 comprises an upper half or 'flip' 702 coupled to a lower half 704 by a hinge 706. The flip 702 comprises a lower part 708 that is coupled to the lower half 704, and a pivoting head 710 that is coupled to the lower part 708 of the flip 702 by a pivot mechanism schematically represented at 712. The pivoting head 710 comprises an earpiece speaker 714, and a camera 716 located on a first side 718 of the pivoting head 710, and a display 720 (indicated by dashed lines) on a second side 722 of the pivoting head 710 opposite from the camera 716.

While exemplary embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A cellular telephone comprising:
   a first part having a longitudinal axis substantially in the center of the first part, the first part including a display;
   a second part coupled to the first part by a pivot mechanism that includes a pivot axis that makes an angle of less than ninety degrees with the longitudinal axis of the first part, whereby the second part can be oriented to face different azimuthal angles about the longitudinal axis of the first part, the second part including a camera; and
   a third part connected to the first part by a hinge that includes a hinge axis, the third part including a keypad.

2. The cellular telephone according to claim 1 wherein:
   the hinge axis is normal to the pivot axis.

3. The cellular telephone according to claim 1 wherein:
   the pivot axis makes an angle of less than 20 degrees with the longitudinal axis.

4. The cellular telephone according to claim 3 wherein:
   the pivot axis makes an angle of less than 15 degrees with the longitudinal axis.

5. The cellular telephone according to claim 1 wherein:
   the first part comprises a first surface;
   the second part comprises a second surface located adjacent the first surface of the first part; and
   the pivot mechanism comprises:
   a pinion extending from one of the first and second surfaces; and a hole formed in another of the first and second surfaces, wherein the pinion extends into the hole.

6. The cellular telephone according to claim 5 further comprising:
a spring seat located in one of the first and second parts, around the hole;
a spring retainer attached to the pinion; and
a coil spring located around the pinion between the spring seat and the spring retainer.

7. The cellular telephone according to claim 5 further comprising:
an annular, axially acting cam disposed on one of the first and second surfaces; and
an annular, axially engaging follower disposed on another of the first and second surfaces, and positioned to engage the axially acting cam.

8. The cellular telephone according to claim 7 wherein:
the annular axially acting cam is concentric to the pinion; and
the annular axially engaging follower is concentric to the hole.

9. The cellular telephone according to claim 1 wherein: the second part comprises an second display.

10. The cellular telephone according to claim 1 wherein: the second part comprises a camera.

11. The cellular telephone according to claim 10 wherein: the second part comprises a display, wherein the display and the camera face in opposite directions.

12. The cellular telephone according to claim 1 further comprising:
a stop mechanism for limiting rotation of the first part relative to the second part.

13. A flip type portable telephone comprising:
a first section including a keypad; and
a flip second section connected to the first section by a hinge, wherein the flip section comprises:
a first part that is directly connected to the hinge, the first part comprising a first display; and
a pivoting head coupled to the first part by a pivot and further coupled to the first section via the first part, wherein the pivot allows the pivoting head to be oriented to face different directions, and wherein the pivoting head includes a camera.

14. The flip type portable telephone according to claim 13 wherein:
the pivoting head comprises a camera and a display that face in opposite directions.

15. The flip type portable telephone according to claim 14 wherein:
the pivoting head further comprises an earpiece speaker.

16. A cellular telephone comprising:
a first pan having a longitudinal axis, the first part including a display; and
a second part coupled to the first part by a pivot mechanism that includes a pivot axis that makes an angle of less than ninety degrees with the longitudinal axis of the first part, whereby the second part can be oriented to face different azimuthal angles about the longitudinal axis of the first part,
wherein
the second part comprises a first surface and a second surface;
the pivot axis is tilted with respect to the longitudinal axis by an angle of alpha; and
the first surface and the second surface are tilted in opposite directions with respect to the pivot axis by the angle alpha.

17. The cellular telephone according to claim 16 wherein:
the first part comprises a third surface and a first display located at the third surface; and
the second part comprises a second display that is disposed at the first surface of the second part.

18. The cellular telephone according to claim 16 further comprising:
a third part coupled to the first part by a hinge, that includes a hinge axis, wherein the hinge axis is perpendicular to the longitudinal axis.

* * * * *